United States Patent [19]

Greenfield et al.

[11] Patent Number: 5,110,528
[45] Date of Patent: May 5, 1992

[54] PROCESS FOR MAKING SCULPTURED INTERFITTING PIECES

[76] Inventors: Nancy C. Greenfield, 10740 Strathern St., Sun Valley, Calif. 91352; James S. Greenfield, 93 Wyckoff St., Brooklyn, N.Y. 11201

[21] Appl. No.: 147,293

[22] Filed: Jan. 22, 1988

[51] Int. Cl.⁵ ............................................. B29C 39/02
[52] U.S. Cl. .................................. 264/138; 264/160; 264/163; 264/220; 264/226; 264/250; 264/255
[58] Field of Search ............... 264/250, 255, 219, 220, 264/221, 225, 226, 227, 138, 160, 163

[56] References Cited

U.S. PATENT DOCUMENTS

| 3,076,231 | 2/1963 | Vertin | 264/250 |
| 4,048,709 | 9/1977 | Deem | 264/227 |
| 4,364,880 | 12/1982 | Howse | 264/255 |

FOREIGN PATENT DOCUMENTS 2584338  7/1985  France ............................. 264/255

Primary Examiner—Jay H. Woo
Assistant Examiner—Jeremiah F. Durkin, II

[57] ABSTRACT

A process for forming a plurality of interfitting sculptured pieces of irregular fanciful shapes having complementary curved surfaces. The pieces are formed of urethane plastic or other appropriate molded material.

2 Claims, 3 Drawing Sheets

PROCESS FOR MAKING SCULPTURED INTERFITTING PIECES

BACKGROUND OF THE INVENTION

In one of its embodiment the article of the invention may take the form of a three-dimensional jigsaw puzzle formed of a number of three-dimensional pieces interfitted with one another to form the article.

Each of the pieces is composed of a moldable plastic material, such as urethane. Each piece has a distinctive irregular shape with curved surfaces complementing the curved surfaces of the other pieces to permit the pieces to be interfitted with one another in a particular manner to form the article.

An objective of the invention, accordingly, is to provide a take-apart article which is made up of a multiplicity of complex interfitting pieces having irregular complementary surfaces.

Another objective of the invention is to provide such an article in which the individual pieces are of a sufficiently complex shape so that when disassembled they may constitute a puzzle which requires a high level of ingenuity in assembling the pieces to form the article.

Yet another objective of the invention is to provide such an article in which each of the individual pieces has an irregular shape with curved surfaces complementing the surfaces of the other pieces, and to provide a process for forming the individual pieces.

DETAILED DESCRIPTION OF THE ILLUSTRATED EMBODIMENT

Figure 1:
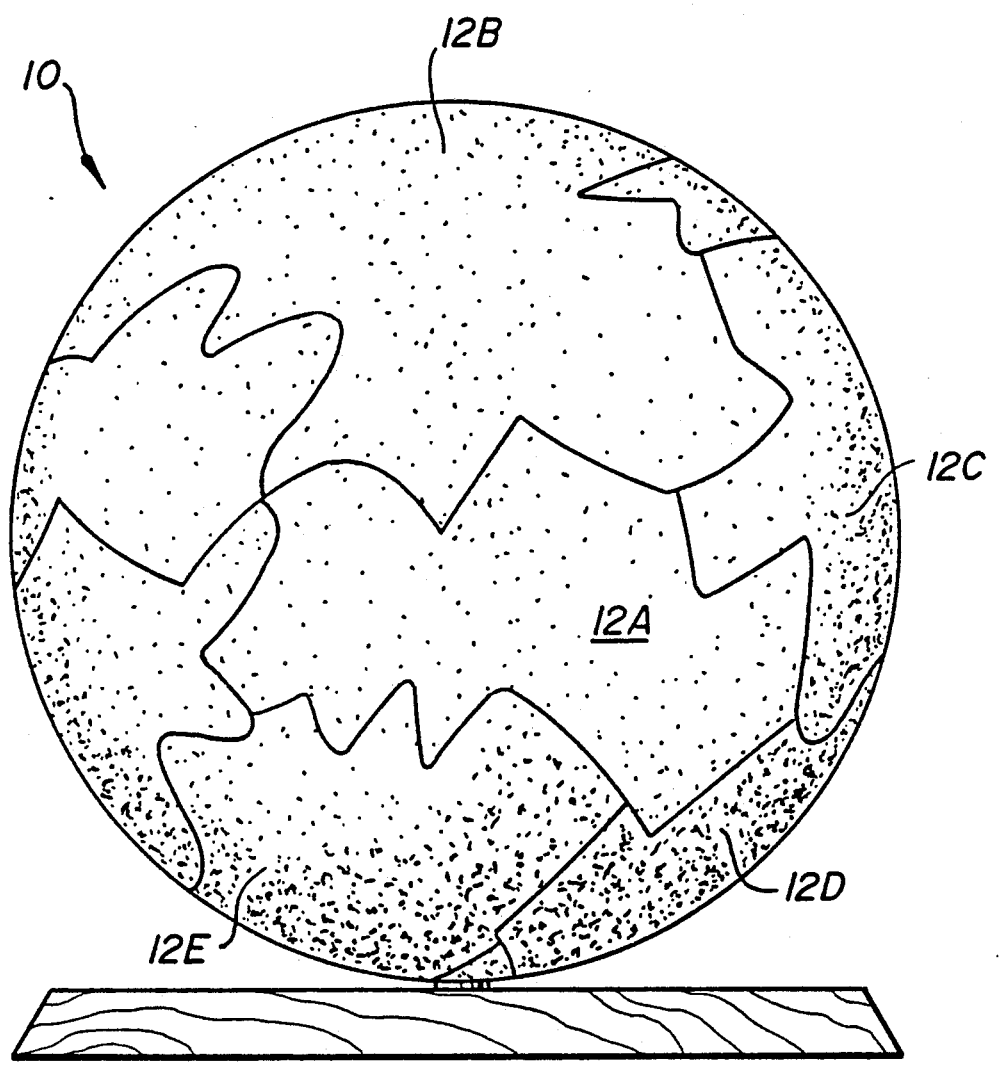
FIG. 1 is a representation of an article in the form of a take-apart ball which is made up of a multiplicity of irregularly shaped interfitting pieces in accordance with the present invention.

As shown in FIG. 1, the article in that particular embodiment constitutes a take-apart ball 10 which is made up of a multiplicity of interfitting three-dimensional pieces 12A, 12B, 12C, 12D, 12E, etc., with each of the pieces being sculpted to a particular shape, and with each piece having a curved surface which complements the surface of the adjacent pieces. The individual pieces are formed of urethane plastic, or other appropriate moldable material.

Figure 2:
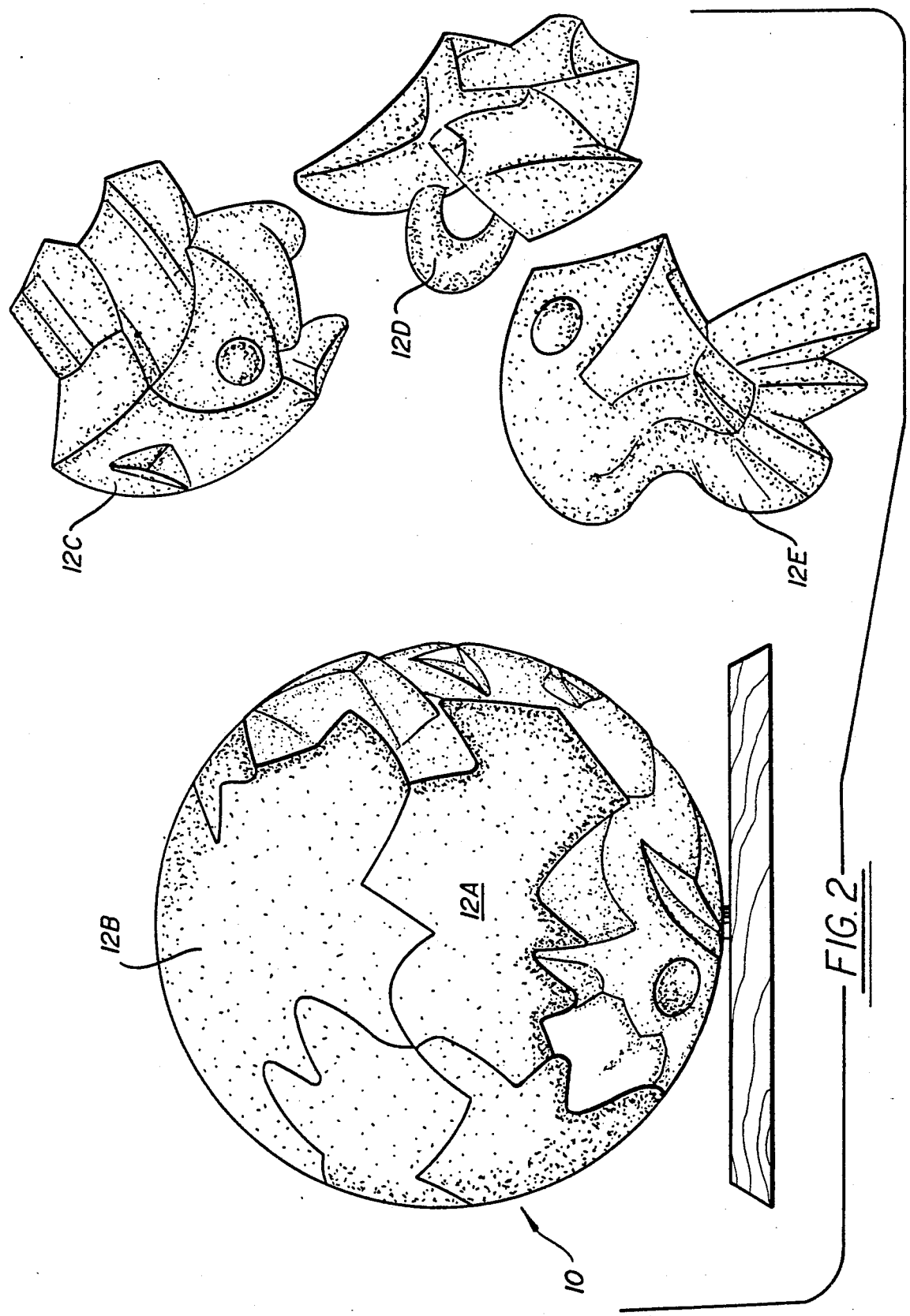
FIG. 2 is a representation of the take-apart ball of FIG. 1 with certain pieces detached from the ball.

It should be understood that the embodiment of FIGS. 1 and 2, in which the various pieces interfit with one another to form a take-apart ball represents but one example of the invention. The overall appearance and shape of the finished article may have an unlimited scope of variations to form actual objects, such as toy trains, toy dolls, and the like, or to take on any number of a variety of abstract and/or other decorative shapes.

Figure 3A:
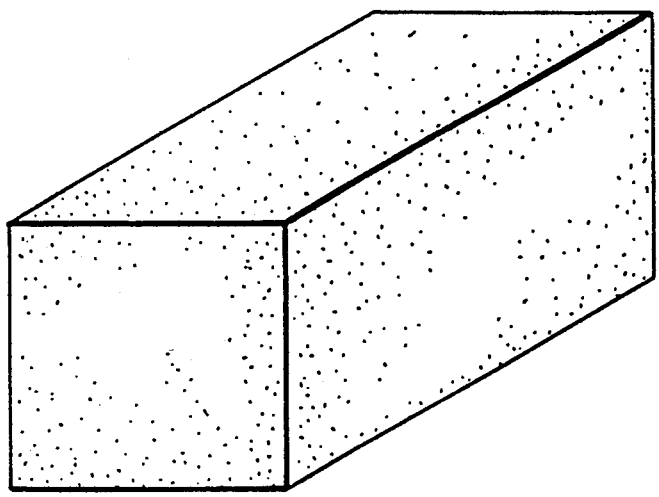
FIGS. 3A, 3B and 3C illustrate three steps in the process for forming the pieces which make up the take-apart article of the invention.

The individual pieces which make up the take-apart article of FIGS. 1 and 2 may be formed in the manner shown in FIG. 3, and by the following process steps:

1. A piece of a selected plastic material is formed, for example, into a block, such as shown in FIG. 3A. An appropriate material is urethane plastic, as mentioned above.

2. The block in FIG. 3A is then carved into any desired abstract shape having curved surfaces, to constitute the first piece of the article shown in FIG. 3B. The first piece, and all other pieces of the article, may individually constitute separate abstract sculptured works of art.

Figure 3B:
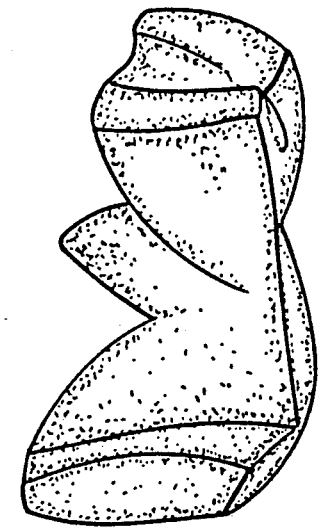
Figure 3C:
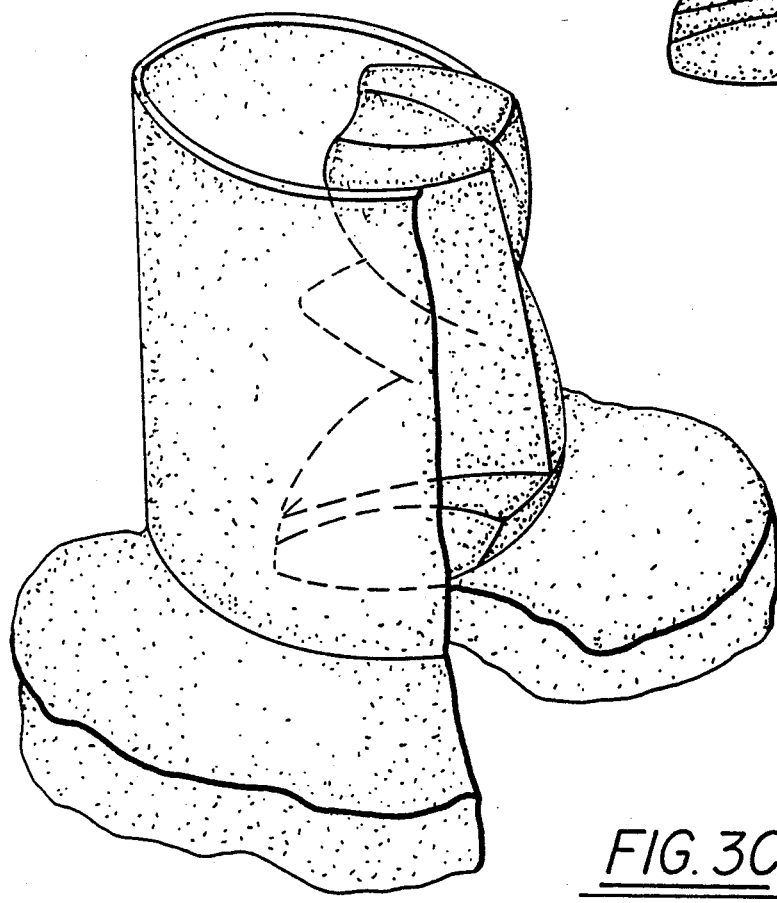

3. A portion of the surface of the piece of FIG. 3B is then surrounded by a soft clay set-up as shown in FIG. 3C, which is shaped by hand into the illustrated configuration to provide a supporting base, and also to provide an inner surface spaced from the selected portion of the surface area of the piece to constitute a mold.

4. Appropriate agents are mixed together to form liquid urethane, or the like, which is poured into the mold and allowed to set. The mold and the resulting second piece of the article are then removed from the first piece. A portion of the surface of the second piece now has a complementary shape to the portion of the surface of the first piece. The remaining portion of the surface of the second piece is then carved into a desired configuration.

5. The second piece is then fitted back against the first piece, and the molding operation is repeated to form the third piece. The third piece is then removed from the first two pieces and the remaining portion of its surface is carved into a desired shape.

6. The previous steps are repeated from piece-to-piece until sufficient pieces have been formed so as to constitute the inner portion of the article.

7. The pieces are then all fitted together, and are placed in a surrounding mold which, in the case of the embodiment of FIGS. 1 and 2, has a spherical configuration. The liquid urethane plastic is then poured into the latter mold and is allowed to set. The mold is then removed, and the final pieces are cut so as to create the article of FIG. 1.

8. Upon the completion of the prototype article of FIG. 1, individual molds are formed for each piece in accordance with known molding practice, so that each piece may be readily and easily duplicated for mass production of the article.

A decorative coating may be provided for the article, and/or for the individual pieces, if so desired.

The invention provides, therefore, a unique take-apart article which is formed of separate interfitting pieces having irregularly surfaces which, in each instance, are complemented by the adjacent pieces. The invention also provides a simple and improved process for forming the pieces which constitute the take-apart article.

It will be appreciated that while a particular embodiment of the invention has been shown and described, modifications may be made. It is intended in the claims to cover all modifications which come within the true spirit and scope of the invention.

We claim:

1. A process for forming a take-apart article composed of a plurality of interfitting irregularly shaped pieces having curved complementary interfitting surfaces, which process comprises: (a) carving a selected moldable material into a desired configuration to form a first irregularly shaped piece of the article; (b) surrounding a portion of the surface of the first piece with a set-up to provide a mold adjacent to said first portion; (c) pouring a liquid moldable material into the mold; (d) allowing the moldable material to set to form a second piece of the article having a first portion of its surface complementing the irregular shape of the corresponding portion of the first piece and having a second portion of its surface conforming with the inner surface of the mold; (e) carving the second portion of the surface of the second piece into a desired irregular configuration; (f) fitting the second piece against the first piece, and repeating steps (b), and (c), with respect to the first and second pieces; and (g) repeating steps (b)–(f) with respect to additional pieces until a desired number of individual pieces have been formed to constitute the take-apart article.

2. The process defined in claim 1, and which comprises: (h) shaping a selected material into a desired configuration to constitute a mold; (i) fitting the desired number of pieces of the article together; and (j) placing the fitted-together pieces into said further mold to achieve the desired external shape of the take-apart article.

* * * * *